United States Patent
Kanteti (10) Patent No.: US 11,604,591 B2
(45) Date of Patent: Mar. 14, 2023

(54) ASSOCIATING DATA TYPES WITH STREAM IDENTIFIERS FOR MAPPING ONTO SEQUENTIALLY-WRITTEN MEMORY DEVICES

(71) Applicant: Micron Technology, Inc., Boise, ID (US)

(72) Inventor: Kumar V K H Kanteti, Sunnyvale, CA (US)

(73) Assignee: Micron Technology, Inc., Boise, ID (US)

( * ) Notice: Subject to any disclaimer, the term of this patent is extended or adjusted under 35 U.S.C. 154(b) by 166 days.

(21) Appl. No.: 17/247,587

(22) Filed: Dec. 17, 2020

(65) Prior Publication Data

US 2022/0197508 A1    Jun. 23, 2022

(51) Int. Cl.
*G06F 3/06*    (2006.01)

(52) U.S. Cl.
CPC ............ *G06F 3/064* (2013.01); *G06F 3/0604* (2013.01); *G06F 3/0631* (2013.01); *G06F 3/0659* (2013.01); *G06F 3/0679* (2013.01)

(58) Field of Classification Search
CPC ...... G06F 3/064; G06F 3/0604; G06F 3/0631; G06F 3/0659; G06F 3/0679
See application file for complete search history.

(56) References Cited

U.S. PATENT DOCUMENTS

| | | | | |
|---|---|---|---|---|
| 10,891,070 B1* | 1/2021 | Akin | ................ | G06F 3/0604 |
| 11,307,931 B1* | 4/2022 | Bert | ................ | G06F 11/1428 |
| 11,392,553 B1* | 7/2022 | Power | ................ | G06F 16/122 |
| 11,393,510 B2* | 7/2022 | Suhler | ................ | G06F 3/064 |
| 2015/0339319 A1* | 11/2015 | Malina | ................ | G06F 3/0605 |
| | | | | 707/737 |
| 2018/0232154 A1* | 8/2018 | Matthew | ................ | G06F 3/0688 |
| 2018/0275889 A1* | 9/2018 | Matthew | ................ | G06F 12/0246 |
| 2019/0004724 A1* | 1/2019 | Kanno | ................ | G06F 3/0688 |
| 2019/0095116 A1* | 3/2019 | Igahara | ................ | G06F 3/0634 |
| 2019/0155521 A1* | 5/2019 | Bahirat | ................ | G06F 12/0246 |
| 2019/0189167 A1* | 6/2019 | Suhler | ................ | G06F 3/0616 |
| 2019/0205062 A1* | 7/2019 | Sun | ................ | G06F 3/0679 |
| 2019/0303038 A1* | 10/2019 | Hubbard | ................ | G06F 3/0685 |
| 2021/0132827 A1* | 5/2021 | Helmick | ................ | G06F 3/0679 |
| 2022/0113899 A1* | 4/2022 | Jung | ................ | G06F 3/064 |

* cited by examiner

*Primary Examiner* — Francisco A Grullon
(74) *Attorney, Agent, or Firm* — Lowenstein Sandler LLP (57) ABSTRACT

A system includes a plurality of integrated circuit (IC) dice having memory cells. A processing device is coupled to the plurality of IC dice, the processing device to perform operations includes: assigning a first stream identifier (ID) to a data type generated by execution of an application within an operating system; associating first files generated by the application with the first stream ID, where the first files are associated with the data type; allocating a first group of memory cells of the plurality of IC dice to the first files, wherein the first group of memory cells is assigned the first stream ID; and causing, based on the first stream ID, the first files to be written sequentially to the first group of memory cells of the plurality of IC dice.

19 Claims, 7 Drawing Sheets

ASSOCIATING DATA TYPES WITH STREAM IDENTIFIERS FOR MAPPING ONTO SEQUENTIALLY-WRITTEN MEMORY DEVICES

TECHNICAL FIELD

Embodiments of the disclosure relate generally to memory sub-systems, and more specifically, related to associating data types with stream identifiers for mapping onto sequentially-written memory devices.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to associating data types with stream identifiers for mapping onto sequentially-written memory devices. A memory sub-system can be a storage device, a memory module, or a hybrid of a storage device and memory module. Examples of storage devices and memory modules are described below in conjunction with FIG. 1A. In general, a host system can utilize a memory sub-system that includes one or more components, such as memory devices that store data. The host system can provide data to be stored at the memory sub-system and can request data to be retrieved from the memory sub-system.

The memory sub-system can include multiple components, such as memory devices that can store data from the host system in storage media, e.g., integrated circuit (IC) dies having addressable memory cells that individually store the data. Processing in certain memory sub-systems today is generally performed with random allocations to the IC dies and in small increments of data, e.g., four kilobytes (KB). These random allocations of a page or a block of data include non-sequential and/or random writes to the IC dies. This practice results in high costs in memory, e.g., dynamic random access memory (DRAM), static random access memory (SRAM), or persistent memory, for storing mapping data structures that track logical-to-physical (LTP) address mapping between logical block address (LBA) space and physical address space of the IC dies. For example, mapping overhead is about a gigabyte (GB) per terabyte (TB) of host addressable media, and thus, a 16 TB solid-state drive (SSD) requires a significant 16 GB of memory mapping overhead. Additionally, periodic snapshotting and logging is done to persist the mapping data structures across shutdowns and surprise power failure situations. This adds additional write overhead to the IC dies and performance loss.

Storage stacks are in the process of being modified to take advantage of sequential input-output (IO) memory device efficiencies. For example, storage stacks included in file systems group data by locality (e.g., according to thread, process, or application) and write the data sequentially to storage devices. File systems can then write data of different localities as parallel sequential streams to storage devices, each stream having its own locality. Reference to locality can reference either temporal locality or spatial locality. Data having temporal locality is data that a processor tends to access at the same memory locations repetitively over a short period of time, e.g., data written, over-written, and trimmed around the same time. Data having spatial locality captures the tendency that when a memory device references a particular storage location at a particular time, then the memory device is likely to reference nearby memory locations in the near future. In this case, a processor can attempt to determine the size and shape of the area around the current reference for which it is worthwhile to prepare for faster access for subsequent reference. Reference to sequential locality is a special case of spatial locality that occurs when data elements are arranged and accessed linearly, such as in traversing the elements in a one-dimensional array.

When data having locality are written sequentially, the data are written to groups of memory cells that are also referred to as zones for simplicity, where each zone can store multiple physical blocks of data. Thus, mapping can be recorded at a higher granularity (megabytes instead of kilobytes) in order to map a particular data group as a zone in the LBA space, which significantly reduces metadata that is logged. The mapping space associated with the LBA space at this granularity can be referred to as zoned namespace (ZNS), and a memory device written in this manner referred to as a ZNS memory device. In one example, a data group is made up of multiple blocks of data having locality, where each data block corresponds to a physical block (e.g., erase unit) of the IC dies. In one embodiment, the physical block (or erase unit) of a memory device is around 16 megabytes (MB) in size. The groups of memory cells (or zones) can be at least two to four times (or more) the size of the physical block. Accordingly, the zones can store at least 64 MB of data (e.g., 64 MB, 128 MB, 256 MB, 512 MB, or more), each of which is significantly larger than four kilobytes (KB).

In certain host operating systems, a file system handles management of files from the operating system, from applications running on the operating system, and metadata generated by the file system for purposes of organization of files and allocation of space in the IC dice necessary to write the files and metadata as they are generated. File systems of certain host operating systems such as Linux, Unix, and the like, allocate block groups (e.g., a contiguous portion of a file such as a series of LBAs) to a series of physical addresses of the IC dice at which to store the block group. The files can be, e.g., data files, metadata including index node (inodes), directory structure, free space manager, and the like, and other data structures (or objects) capable of packaging data/metadata and being written to the IC dice, which will be discussed in more detail. These file systems typically allocate certain types of block groups to a particular series of physical addresses of the IC dice based on whether the block groups contain data or metadata, and try not to intermix the data and metadata within these particular series of physical addresses.

In these host operating systems, the file systems are not adapted to allocate files or block groups to zones or to write the block groups sequentially as done within zones of ZNS-managed memory devices. Until now, sequential writing to ZNS-managed memory devices has been managed at the memory device level by a memory sub-system controller, e.g., which acts as an intermediary between the file system of the host and the storage device. Management within the memory sub-system controller adds a level of complexity, including LTP address mapping, logging metadata, and corresponding resource requirements for handling non-sequential IO writes despite the majority of the IO writes being sequential write operations.

At least some aspects of the present disclosure address the above and other deficiencies through configuring the host system (e.g., the file system of the host operating system) with the ability to assign stream IDs to particular data types and to particular metadata types, and allocating each zone (e.g., group of memory cells) to one of these particular data types or metadata types using the stream ID. In this way, the file system uses data streams, and corresponding stream IDs of the data streams, for file/data structure management and storage allocation within IC dice of ZNS-managed memory devices.

Further, copy-on-write (COW) management of storage devices is generally best suited for sequential writing because, once data is written, the data is not overwritten. More specifically, COW is a resource-management technique in computer programming to efficiently implement a duplicate or copy operation on modifiable resources in memory. If a resource is duplicated but not modified, it is not necessary to create a new resource; the resource can be shared between the copy and the original. Where a file system writes to a storage device sequentially, it is more efficient to do so using COW management. For example, data of a similar type can be written as a group and thus can eventually be rewritten elsewhere as a group as well, before becoming stale and subject to garbage collection, including erasure. Writing files of the same data type as a group can thus minimize garbage collection and reduce write amplification. Further, in some embodiments, the kernel of the host operating system includes device mapping logic that can directly cause the files to be written to physical addresses of individual zones and thus map logical addresses to physical addresses of sequentially-written zones, by-passing the need for the memory sub-system controller to handle this mapping.

Accordingly, in one embodiment, a file system can assign a first stream identifier (ID) to a first data type generated by execution of an application within an operating system, for example. The file system can further associate first files generated by the application with the first stream ID, due to the first files being associated with the first data type. In some embodiments, this is performed via adding the stream ID to the file name or a metadata structure provided within the file (e.g., a data structured file). The file system can further allocate a first zone (e.g., group of memory cells) of the IC dice to the first files that are associated with the first stream ID. The file system can then cause, based on the first stream ID, the first files (identified out of thousands of files) to be written sequentially to the first group of memory cells of the IC dice. If second files of another application, which are of a different data type, are detected that are associated with a second stream ID, the file system can cause the second files to be written sequentially to a second zone that has been assigned a second stream ID, for example.

In another embodiment, the file system can assign a third stream ID to a third data type generated due to execution of an operating system. The file system can associate third files of system data generated by the operating system with the third stream ID, where the third files are associated with the third data type. The system data can be, for example, system superblocks of data or system metadata generated by the operating system. The file system can further allocate a third zone (e.g., a group of memory cells) of the IC dice to the third files that are associated with the third stream ID. The file system can then cause, based on the third stream ID, the third files to be written sequentially to the third zone of the IC dice. Each of the first zone, the second zone, and the third zone can be at different locations of the ZNS memory device, but can still each be individually sequentially written. Once a zone (e.g., the first zone) becomes fully written, the file system can allocate a new zone (e.g., a fourth zone) to which files of a particular data type (e.g., the first data type) can continue to be sequentially written. In doing so, the file system can assign the files (or block groups of files) to a fourth stream ID that has been assigned to the fourth zone, thus allocating the first files now to the fourth zone.

Advantages of the present disclosure include but are not limited to significantly minimized garbage collection (restricted to metadata) and reduced write amplification due to writing similar data type files in groups sequentially by zone. Further, the load balancing of performing writes across multiple zones for different data types (e.g., according to stream ID) enables predictable write performance, where writes are often a bottleneck in current file systems. Because the organization of data type files into streams and directing those streams to be written at identified zones is performed at the file system of the host, including ZNS device mapping capability performed by the kernel of the host operating system, advantages also include significant mapping overhead reduction as well as reduction in periodic snapshotting and logging that would otherwise be performed to persist mapping data structures in case of power failure/shutdown. Other advantages will be apparent to those skilled in the art of memory allocation and mapping to memory devices discussed hereinafter.

Figure 1A:
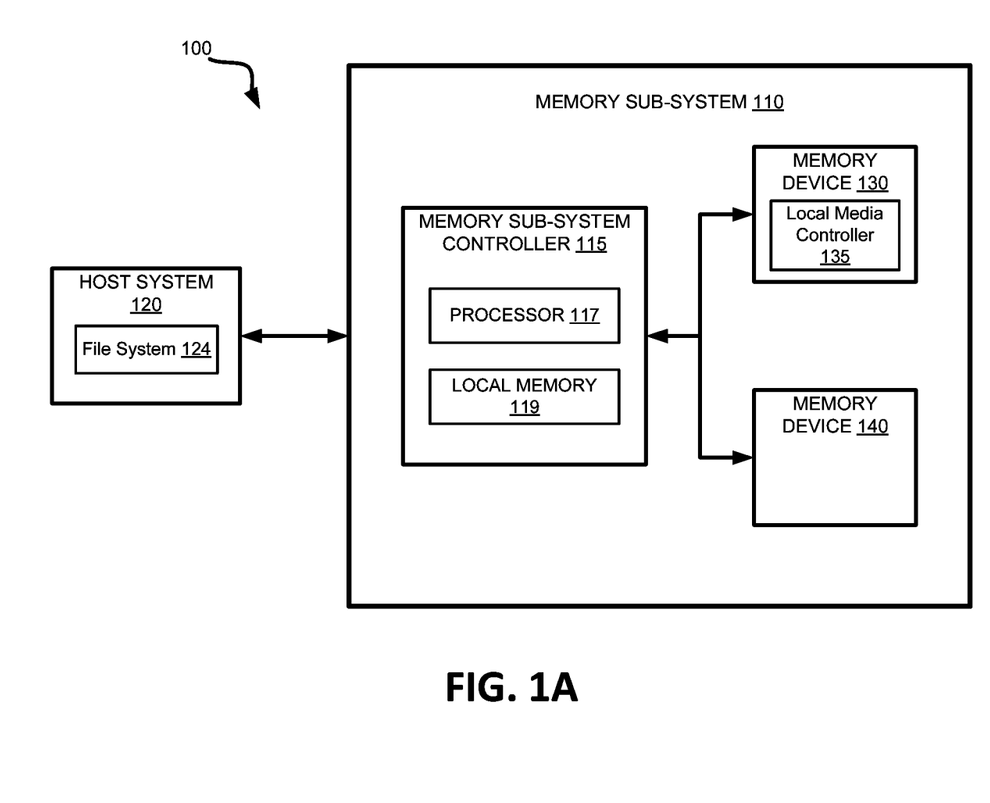
FIG. 1A illustrates an example computing system that includes a host and memory sub-system according to embodiments.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such. Each memory device 130 or 140 can be one or more memory component(s).

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1A illustrates one example of a host system 120 coupled to one memory sub-system 110. As used herein, "coupled to" or "coupled with" generally refers to a connection between components or devices, which can be an indirect communicative connection or direct communicative connection (e.g., without intervening components or devices), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface, which can communicate over a system bus. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical block address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a management memory device, which is a raw memory device 130 having control logic (e.g., local media controller 135) on the die and a controller (e.g., memory sub-system controller 115) for memory management within the same memory device package. An example of a managed memory device is a managed NAND (MNAND) device.

The computing system 100 includes a file system 124 in the host system 120 that is configured with file organization and storage allocation functionality discussed herein throughout the Figures. In some embodiments, the host system 120 includes at least a portion of the file organization and storage allocation functionality. In other embodiments, or in combination, the controller 115 and/or a processing device of the host system 120 includes at least a portion of the file organization and storage allocation functionality. For example, the controller and the processing device (processor) of the host system 120 can be configured to execute instructions stored in memory for performing the operations of the file organization and storage allocation functionality described herein.

Figure 1B:
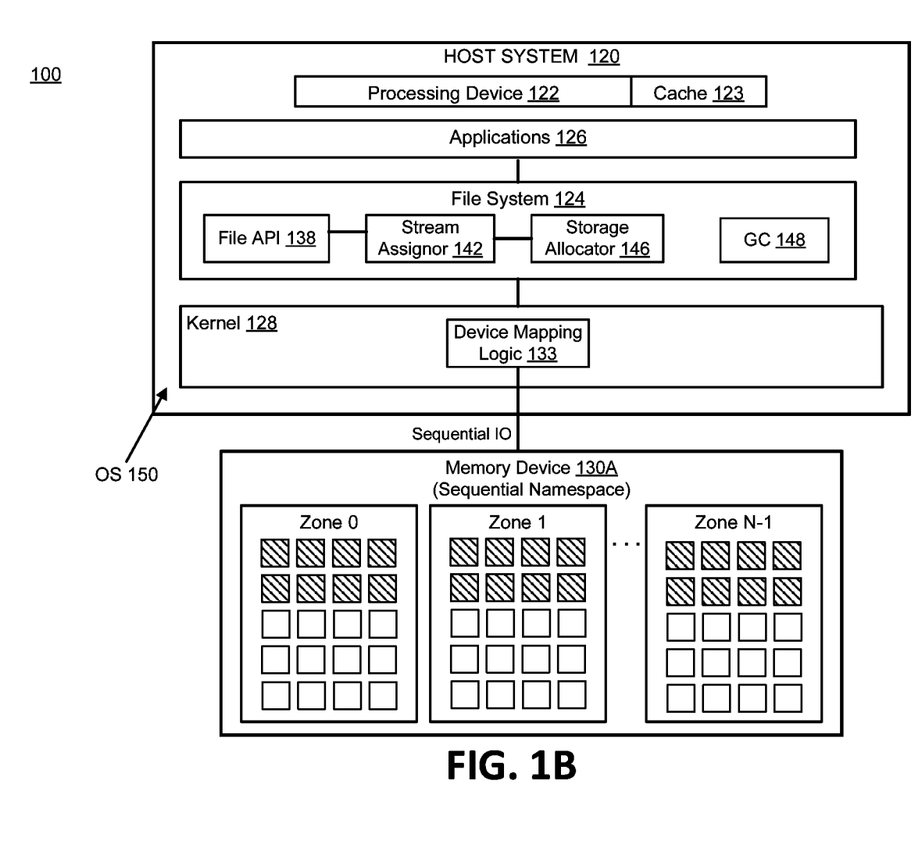
FIG. 1B is a detailed block diagram of the computing system of FIG. 1A according to some embodiments.

FIG. 1B is a detailed block diagram of the computing system 100 of FIG. 1A according to some embodiments. In various embodiments, the host system 120 includes a processing device 122, a cache 123, and an operating system 150 having a file system 124 (e.g., a host file system), one or more applications 126, and a kernel 128. The kernel 128 can include device mapping logic 133. In some embodiments, the file system 124 includes a file application programming interface (API) 138, a stream assignor 142, a storage allocator 146, and a garbage collector (GC) 148. The garage collector 148 can perform garbage collection of stale physical blocks of memory that can be erased and written to again, as is customer in COW architecture. In embodiments, the processing device 122 performs instructions to execute the kernel 128, e.g., a kernel of the operating system 150. The file system 124 and the applications 126 can run on the kernel 128, which can be viewed as the controller of the operating system 150.

In various embodiments, the computing system 100 includes a memory device 130A associated with sequential namespace (e.g., ZNS) and a memory device 130B associated with non-sequential namespace (e.g., random NS). In one embodiment, the memory device 130A is a Zoned Namespace (ZNS) solid state device that implements the Zoned Namespace Command Set as defined by the NVM Express™ (NVMe™) organization. The memory device 130A can be the storage device previously referred to that includes multiple IC dice. Writing sequentially to the zones (e.g., Zone 0, Zone 1, ... Zone N−1), which are also referred to herein as groups of memory cells, is generally performed sequentially from the top (or smallest addresses) of the IC dice to the bottom (or largest addresses) of the IC dice, which is illustrated by the patterned blocks of data already written to the illustrated zones. In these embodiments, the kernel 128 tracks logical block numbers (or addresses) of LBA space to the ZNS of the memory device 130A by sequential relationship, e.g., by being programmed to have access to the sequential physical addresses of the zones (or groups of memory cells) within the multiple IC dice of memory device 130A.

A write pointer (WP) to the zones of the memory device 130A can be stored in the cache 123 and readily accessed to determine whether an IO write request is directed to the WP, and thus is sequential, or is not directed to the WP, and is thus non-sequential. The WP for each zone can also be made available to the file system 124 for purposes of storage space allocation within the memory device 130A that is likewise sequential (e.g., covering a contiguous range of physical addresses after the WP) and thus not have to be overwritten at a later time.

In various embodiments, the applications 126 include different types of software programs or architectures, which function differently with respect hardware and supporting software of the computing system 100. In one embodiment, the applications 126 include a log structure merge (LSM)-based architecture such as a database (e.g., Apache Cassandra™), a staged event-driven architecture (e.g., SEDA), a distributed storage and replication architecture (e.g., Dynamo by Amazon®), a data and storage engine model (e.g., Bigtable by Google®), or other such storage engines designed to process and organize structured data, including big data, for example. In some embodiments, using an LSM-based architecture as an example, the application 126 handles a variety of files containing data and/or metadata of different data types (see FIG. 2). Each application 126 can thus generate, access, and/or manage files of one or more data types.

In some embodiments, the file API 138 is programmed to determine information (e.g., metadata) about different files from various sources, including from the applications 126 (also referred to as user data), operating system files (e.g., superblocks of data, system metadata, and the like), and file system metadata, which will be discussed in more detail with reference to FIG. 2. With access to such metadata about these various files of different data types, the file API 138 is able to help the file system 124 perform organization and storage allocation (in the memory device 130A) with respect to the various files or block groups.

For example, in these embodiments, the stream assignor 142 assigns different types of data (e.g., stored in different files or block groups) to different streams (e.g., stream IDs), each of which is allocated to a different particular series of physical addresses in the IC dice of the memory device 130A where the block group is to be written. A block group (BG) can be understood as a contiguous portion (or chunk) of a file (e.g., a series of LB As) that is allocated to a contiguous area of the memory device 130A reserved for a file in the file system 124. This contiguous area can be represented as a range of block numbers (e.g., physical addresses) or tracks on count key memory devices. Larger files can be partitioned into the block groups that are individually tracked to make allocation and management of the files feasible over a necessary series of allocation and writes to the memory device 130A.

By way of example, an extent is allocated inside a block group (BG) in the b-tree file system (Btrfs) file system, developed to run on the Linux kernel. A file can consist of zero or more extents, e.g., the file consists of no extents if sufficiently small and resides inside the inode. For example, suppose a large file of 10 gigabytes (GB) is chunked into pieces of 128 megabytes (MB). Multiples of the 128 MB chunks can be grouped together as extents into an extent map linked to the larger file and that includes metadata. The file system 124 can build and retain extent maps to manage these extents or block groups. In some embodiments, extent trees are intended to divide up the available storage of the memory device 130A into a number of flexible allocation policies. Each extent tree can own a section of the underlying IC dice, and can be assigned to a collection of (or a single) tree roots, directories or index nodes (inodes).

An inode is a data structure in a Unix-style file system that describes a file-system object such as a file or a directory. Each inode stores the attributes and disk block locations of the data of the object. A directory is structured data that contains an entry for itself, its parent, and each of its children. Policies can direct how a given allocation is spread across the available extent trees, allowing an administrator to direct which parts of the file system 124 are striped, mirrored, or confined to a given memory device, for example.

In various embodiments, the stream assignor 142 can also assign a stream ID to each zone (e.g., group of memory cells) as each zone is allocated. To do so, the kernel 128 can provide visibility of zone mappings (according to physical address) to the file system 124. In order to track files (and/or block groups) of a particular data type that are to be allocated to a particular zone (e.g., to be written as a data group or stream), the stream assignor 142 can also associate the files (and block groups) with a particular stream ID that is assigned to the particular zone. In one embodiment, the particular stream ID is added to a file name of the files or to metadata of the block groups. In another embodiment, the particular stream ID is added to a structured portion of the files or block groups, e.g., to a metadata structure built into each file or block group. Other methods of stream ID association are envisioned.

As discussed, the stream assignor 142 (and/or the allocator 146) can associate a block group, which is allocated to a certain data type, with a particular zone using a particular stream ID that has been assigned to the that zone. In this way, the block group becomes associated with the zone, e.g., via the particular stream ID that identifies the zone within ZNS-based storage management. The file system 124 can perform this function in association with an organizational structure that allocates files (and/or block groups) of the same data type to a particular zone, where each zone could include one or more block groups of the same data type. IN one embodiment, there is a one-to-one correspondence between block groups and allocated zones. The files can include, for example, data files, inodes or tree roots, directory, and other data structures or objects capable of packaging data/metadata and being written to the IC dice. In the case that a file is partitioned into block groups, the file system 124 can assign a stream ID to each of these block groups that is associated with an identified zone to which the block group is allocated. When allocation of files to the IC dice of the memory device 130A is discussed herein, allocation of any block groups that make up those files is understood to be the same or similar.

In various embodiments, the storage allocator 146 allocates files (or block groups) to a zone (or group of memory cells) according to stream ID with which the files are associated. For example, the storage allocator 146 can allocate particular (first) files to a first zone that has been assigned a first stream ID by the stream assignor 142. To do so, the file system 124 can associate the first files with the first stream ID. In this way, files (or block groups) that are part of a particular stream (determined by stream ID) are consistently written to the corresponding zone assigned to the particular stream ID.

In generation of individual write IO requests for individual files (or block groups), the file system 124 can access the stream ID within the file name or metadata of each file to determine with which zone the file is associated. The storage allocator 146 can then check whether there is storage space available in the associated zone. If there is sufficient available space for the file (or block group), the storage allocator 146 can allocate, within the associated zone or the group of memory cells, a contiguous range of physical addresses (e.g., an extent) beyond the WP to which to sequentially write the file. Upon successful allocation of the space, the file system 124 can then generate an IO write request directed to the contiguous range of physical addresses in the associated zone. This file allocation algorithm, used for block groups, will be discussed in more detail with reference to FIG. 3. By first allocating contiguous ranges of physical addresses after the WP in each zone, the IO write requests can be issued as sequential (ZNS) IO write requests according and avoid unnecessary overwriting of data or handling of non-sequential IO requests.

Figure 2:
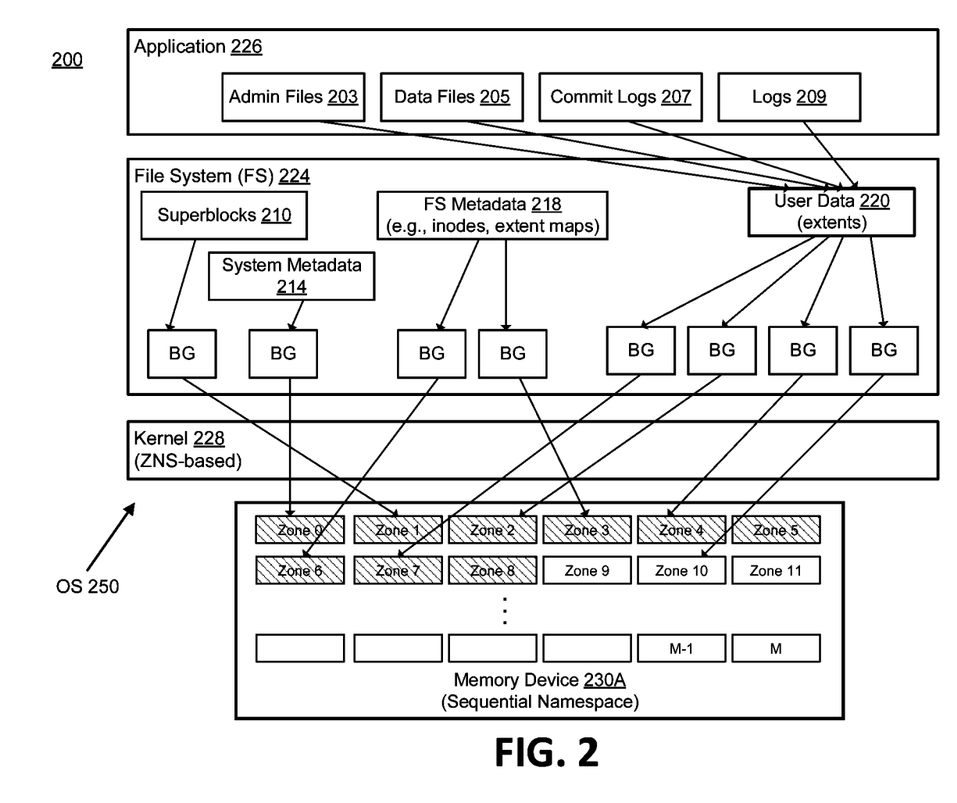
FIG. 2 is a schematic diagram that illustrates a computing system including host file system association of stream identifiers (IDs) with data types and of the stream IDs with particular zones (or groups of memory cells) according to various embodiments.

FIG. 2 is a schematic diagram that illustrates a computing system 200 including host file system association of stream identifiers (IDs) with data types and of the stream IDs with particular zones (or groups of memory cells) according to various embodiments. In various embodiment, the computing system 200 includes a file system 224, at least one application 226, and a kernel 228 of an operating system 250, which are executable by a processing device such as the processing device 122 (FIG. 1B). In one embodiment, the file system 224 is the file system 124 of FIG. 1B and the kernel 228 is the kernel 128 of FIG. 1B. In some embodiments, the application 226 is one of the applications 126 discussed with reference to FIG. 1B. The computing system 200 can further include a memory device 230A, which can be a non-volatile memory device having multiple IC dice similar to the memory device 130A (FIG. 1B).

For purposes of explanation, the application 226 is a database (such as Cassandra™) or similar software application that is based on LSM architecture. Thus, in this embodiment, the application 226 handles files of a number of different data types, including, for example, administration files 203, data files 205, commit logs 207, and system logs 209. The commit logs 207 can be a record of transactions performed by the database application.

In some embodiments, the file system 224 can manage and perform allocation for a number of data types, including but not limited to, superblocks 210 of data and system metadata 215 (generated by the operating system 250), file system (FS) metadata 218 (such as inodes, tree roots, extent maps, and the like), and user data 220, which in this example are different types of extents. The files generated by the application 226 can be associated with the user data 220.

As illustrated in FIG. 2, the file system 224 can partition the files of each data type into a different block group (BG) or series of block groups, and can allocate each block group to a different zone (e.g., group of memory cells) in the memory device 230A, creating a stream of data (or metadata) for each data type that is separately written to the assigned zone as a group. As discussed with reference to FIG. 1B, a stream ID can be assigned to each block group and to the zone to which the block group(s) are allocated. The partitioned files can also be associated with the same stream ID, e.g., through tagging the file in some way with the stream ID. In this way, mapping between block groups and zones is transitive and straight-forward, and sequentially writing to the zones can be striped across the IC dice according to the block groups (or files), creating performance-enhancing load balancing. Simultaneously, because each block group is of the same data type, the data written to each zone are of the same type (or from the same application and thus has data locality), has a similar life span, and are likely to be modified at about the same rate for purposes of efficient garbage collection.

While files/BGs of the superblocks 210, the system metadata 214, inodes (of the FS metadata 218), and extent maps (of the FS metadata 218) can each be assigned to a separate stream (e.g., a different stream ID), files/BGs of the user data 220 can include multiple data types that can be separately assigned to a different stream ID. Table 1 illustrates possible stream ID assignments to different types of user data 220 associated with the application 226 in different embodiments.

TABLE 1

| Data Type | Stream ID |
| --- | --- |
| Admin Files | 0 |
| Commit Logs | 1 |
| System Logs | 2 |
| Data Directory Groups | Based on LSM ID, e.g., 3+ |

Each LSM ID can be associated with a different data directory, and thus assigned a separate stream ID. Additional types of stream ID assignments to different data types is envisioned.

In various embodiments, the file system 224 generates IO write requests to the allocated contiguous range of physical addresses beyond the current WP. In some embodiments, the kernel 228, using the device mapping logic 133, can intercept and direct these IO write requests to be sequentially written to the proper zone, beginning at the current zone WP, else handle the IO write request as a non-sequential write request. In other embodiments, the device mapping logic 133 is integrated within the file system 224, which can directly manage device mapping to proper zones.

Once a zone becomes fully written, e.g., there is no more space for further sequential IO writes, the file system 224 can allocate a new zone to which files/BGs of a particular data type can continue to be sequentially written. Assume the zone that becomes full was assigned a first stream ID (e.g., stream ID_0) and first files/BGs were being allocated to the zone with the first stream ID. In response to a group of memory cells becoming fully written, the file system 224 can allocate a second group of memory cells (the new zone) of the IC dice to the files/BGs. The file system 224 can further assign, to the first files/BGs, a second stream that was assigned to the new (e.g., second) zone. The file system 224 can further cause, based on the second stream ID, additional ones of the files/BGs to be sequentially written to the second group of memory cells.

Figure 3:
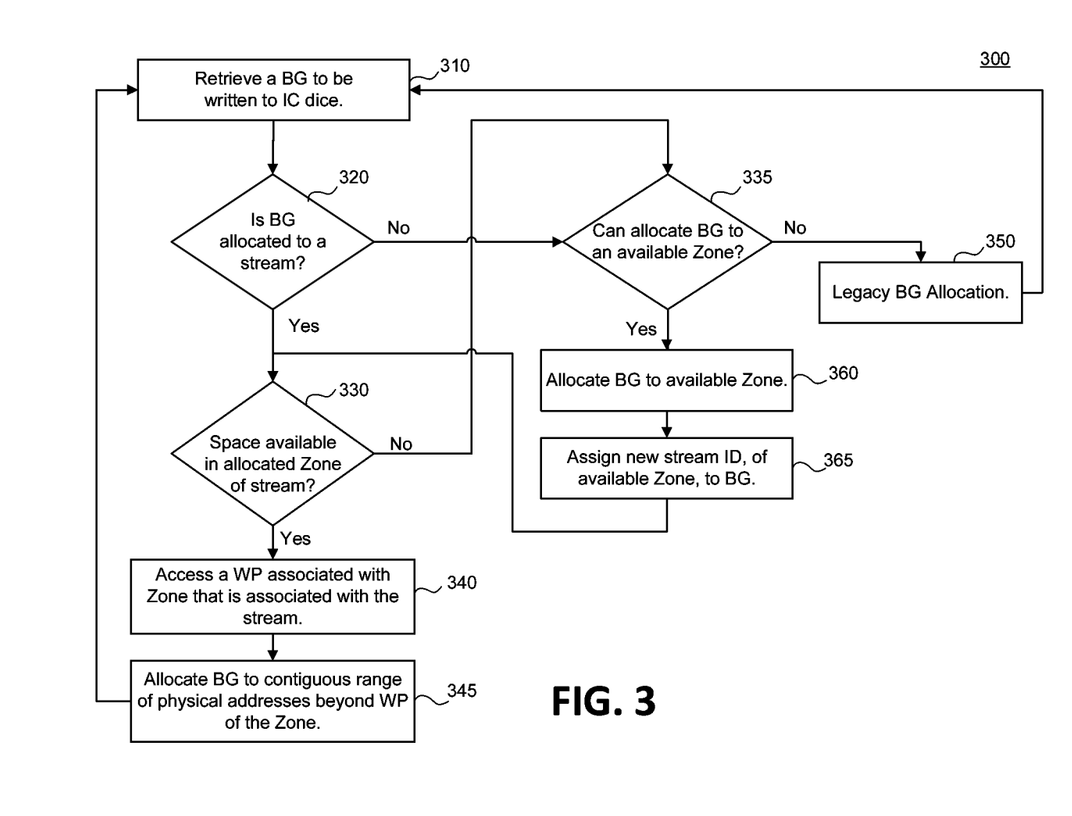
FIG. 3 is a flow chart of a method for allocation of a block group, which is a contiguous portion of a file, to a group of memory cells (or a zone) according to some embodiments.

FIG. 3 is a flow chart of a method 300 for allocation of a block group, which is a contiguous portion of a file, to a group of memory cells (or a zone) according to some embodiments. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the host system 120 (e.g., via execution of the file system 124 or 224 by the processing device 122) of FIGS. 1A-2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic retrieves a block group (BG) to be written to the IC dice of a memory device, e.g., of the memory device 130A or 230A. The block group can be a contiguous portion partitioned from a file that is to be written to the memory device.

At operation 320, the processing logic decides whether a block group is allocated to a data stream. To do so, the processing logic can access block group metadata associated with the BG to determine a stream identifier (ID) assigned to the BG with which the file is associated according to data type, for example.

In response to retrieving the stream ID, at operation 330, the processing logic determines whether there is space available in a group of memory cells (zone) to which to write the BG. If there is space, at operation 340, the processing logic accesses, within the block group metadata, a write pointer associated with the group of memory cells that has been assigned the stream ID. Further, at operation 345, the processing logic allocates, within the group of memory cells, a contiguous range of physical addresses beyond the write pointer to which to sequentially write the BG.

The processing logic can also, in some embodiments, assign the group of memory cells to the file associated with the data type via association of the stream ID with the block group and with the group of memory cells. The processing logic can further generate an input-output (IO) write request that will cause the block group to be sequentially written to the contiguous range of physical addresses of the group of memory cells, starting at the write pointer.

Back at operation 320, in response to the block group of the file not having been allocated to a stream (e.g., the block group metadata contained no stream ID), or back at operation 330, in response to there not being space available in the group of memory cells to which to allocate the file, the processing logic transitions to operation 335. At operation 335, the processing logic determines whether there is a second group of memory cells that is available for new allocations, e.g., to allocate new block groups. If there is not, at operation 350, the processing logic performs legacy block group allocation, to include garbage collection, block fragmentation, random writes, and the like.

If, at operation 335, there is an available second group of memory cells with space for BG allocation, the processing logic, at operation 360, allocates the BG to a second group of memory cells (e.g., an available zone). At operation 365, the processing logic assigns a second stream ID associated with the second group of memory cells to the block group.

The method 300 can then loop back to operation 330, where the processing logic determines that there is allocable space available in the second group of memory cells (the available zone). At operation 340, the processing logic accesses, within the block group metadata, a second write pointer associated with the second group of memory cells. And, at operation 345, the processing logic allocates, within the second group of memory cells, a contiguous range of physical addresses beyond the second write pointer to which to sequentially write the block group.

The method 300 can loop back to operation 310, where the processing logic retrieves a second block group (BG) to be written to the IC dice of the memory device, the second block group being associated with a second file. In one embodiment, at operation 320, the processing logic accesses block group metadata associated with the second block group to determine that the second block group has not been allocated to a group of memory cells, causing the processing logic to again transition to operation 335. At operation 335, the processing logic determines there is a second group of memory cells that is available for new allocations, e.g., which could be the available zone. At operation 360, the processing logic allocates the second block group to the second group of memory cells. At operation 365, the processing logic assigns a second stream ID associated with the second group of memory cells to the second block group.

The method 300 can loop back to operation 330 again, at which the processing logic determines that there is allocable space available in the second group of memory cells. At operation 340, the processing logic accesses, within the block group metadata associated with the second block group, a second write pointer associated with the second group of memory cells. At operation 345, the processing logic allocates, within the second group of memory cells, a contiguous range of physical addresses beyond the second write pointer to which to sequentially write the second block group.

Figure 4:
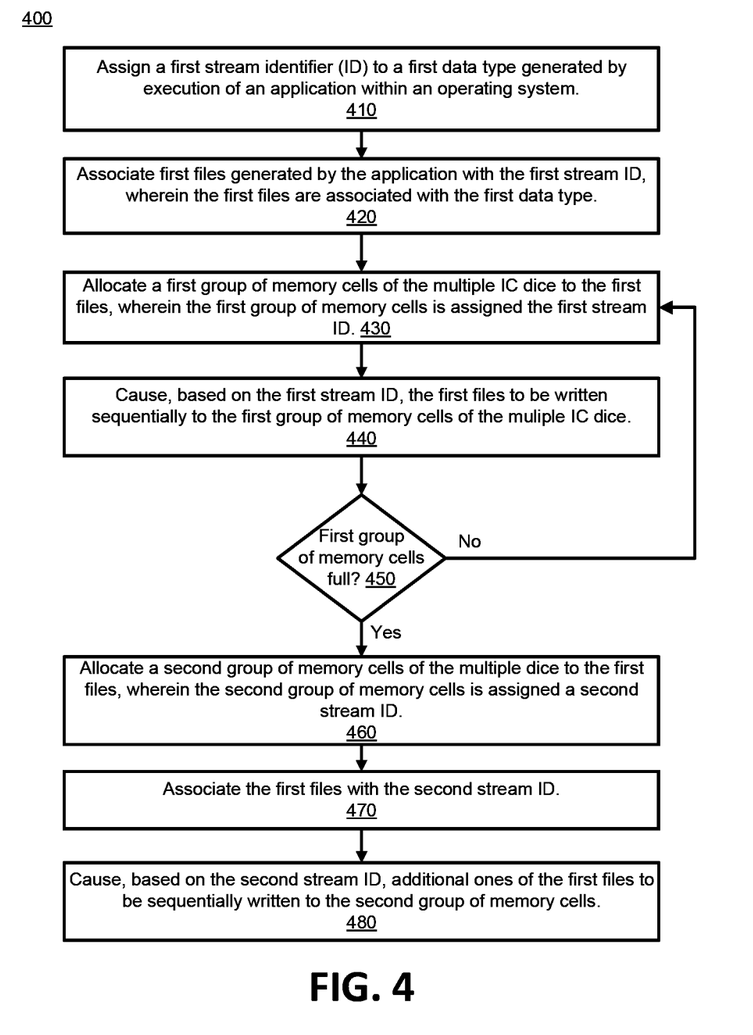
FIG. 4 is a flow chart of a method for assigning a stream ID to an application data type so that files of the data type are associated with a stream ID, which is assigned to a group of memory cells in a sequentially-written memory device, according to an embodiment.

FIG. 4 is a flow chart of a method for assigning a stream ID to an application data type so that files of the data type are associated with a stream ID, which is assigned to a group of memory cells in a sequentially-written memory device, according to an embodiment. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the host system 120 (e.g., via execution of the file system 124 or 224 by the processing device 122) of FIGS. 1A-2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic assigns a first stream identifier (ID) to a first data type generated by execution of an application within an operating system. The application can be a software program run on the operation system. In one embodiment, the application is a database based on LSM architecture.

At operation 420, the processing logic associates first files (or BGs) generated by the application with the first stream ID, where the first files (or BGs) are associated with the first data type. Various user data that could be considered a different data type for purposes assignment of a different stream ID is discussed with reference to FIGS. 1B-2.

At operation 430, the processing logic allocates a first group of memory cells of multiple IC dice to the first files (or BGs), wherein the first group of memory cells is assigned the first stream ID. The first group of memory cells can be a first zone, or contiguous area, of a memory device such as the memory device 130A or 230A.

At operation 440, the processing logic causes, based on the first stream ID, the first files to be written sequentially to the first group of memory cells of the multiple IC dice.

At operation 450, the processing logic determines whether the first group of memory cells becomes fully written, e.g., before a further allocation of the first files to another group of memory cells already occurs. If the answer is no, then the method 400 loops back to operation 430 and continues the allocation and writing to the first group of memory cells as before.

If, at operation 450, the answer is yes, then, at operation 460, the processing logic allocates a second group of memory cells of the multiple dice to the first files, where the second group of memory cells is assigned a second stream ID. At operation 470, the processing logic associating the first files with the second stream ID and, at operation 480, the processing logic causes, based on the second stream ID, additional ones of the first files to be sequentially written to the second group of memory cells.

In some embodiments, the application is a log structure merge (LSM)-based architecture that handles multiple data types including the first data type, such as administrative data, a particular data directory for a particular type of data files, a commit log, or a system-based log. In these embodiments, the processing logic can further assign a another (e.g., third) stream ID to a third data type of the multiple data types and associate third files with the third stream ID, where the third files correspond to the third data type. The processing logic can further allocate a third group of memory cells of the multiple IC dice to the third files, where the third group of memory cells is assigned the third stream ID. The processing logic can further cause, based on the third stream ID, the third files to be written sequentially to the third group of memory cells of the multiple IC dice.

In some embodiments, the operations being performed by the processing logic are executed by a filing system of the operating system. The processing logic can further assign a fourth stream ID to the file system and associate fourth files of file system metadata generated by the file system with the fourth stream ID. The processing logic can further allocate a fourth group of memory cells of the multiple dice to the fourth files that are associated with the fourth stream ID, where the fourth group of memory cells are assigned the fourth stream ID. The processing logic can further cause, based on the fourth stream ID, the fourth files to be written sequentially to the fourth group of memory cells of the multiple IC dice. In some embodiments, the file system metadata includes at least one of an inode, extent trees, or an extent map.

In some embodiments, the operations being performed are executed by a file system of the operating system. The processing logic can further assign a fifth stream ID to system metadata generated by execution of the operating system and associate fifth files containing the system metadata with the fifth stream ID. The processing logic can further allocate a fifth group of memory cells of the multiple IC dice to the fifth files, where the fifth group of memory cells is assigned the fifth stream ID. The processing logic can further cause, based on the fifth stream ID, the fifth files to be written sequentially to the fifth group of memory cells of the multiple IC dice.

Figure 5:
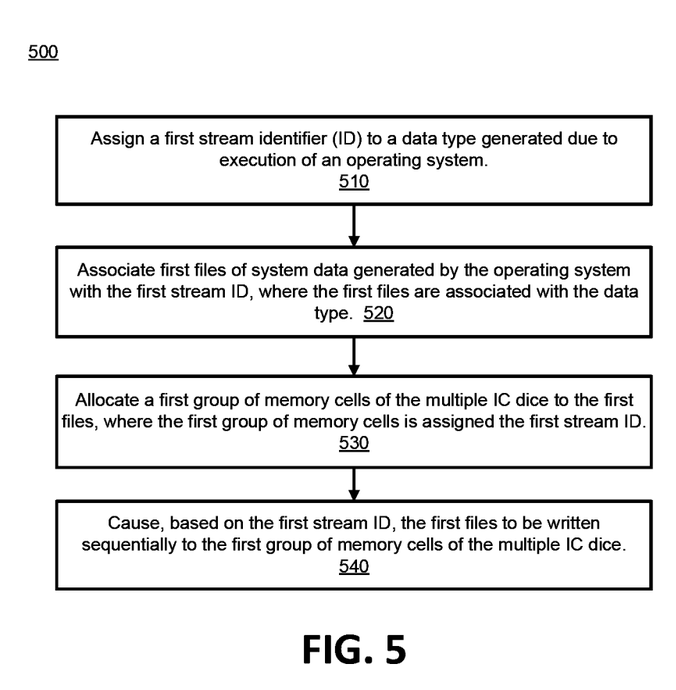
FIG. 5 is a flow chart of a method for assigning a stream ID to operating system data so that the system data are associated with a stream ID, which is assigned to a group of memory cells in a sequentially-written memory device, according to an embodiment.

FIG. 5 is a flow chart of a method 500 for assigning a stream ID to operating system data so that the system data are associated with a stream ID, which is assigned to a group of memory cells in a sequentially-written memory device, according to an embodiment. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the host system 120 (e.g., via execution of the file system 124 or 224 by the processing device 122) of FIGS. 1A-2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing logic assigns a first stream identifier (ID) to a data type generated due to execution of an operating system. This data type can include system data, for example. The operations being performed by the processing logic can be executed by a filing system of the operating system, and the system data can be one of superblocks of data or system metadata generated by the operating system At operation 520, the processing logic associates first files of system data generated by the operating system with the first stream ID, where the first files are associated with the data type.

At operation 530, the processing logic allocates a first group of memory cells of the multiple IC dice to the first files, where the first group of memory cells is assigned the first stream ID.

At operation 540, the processing logic causes, based on the first stream ID, the first files to be written sequentially to the first group of memory cells of the multiple IC dice.

Figure 6:
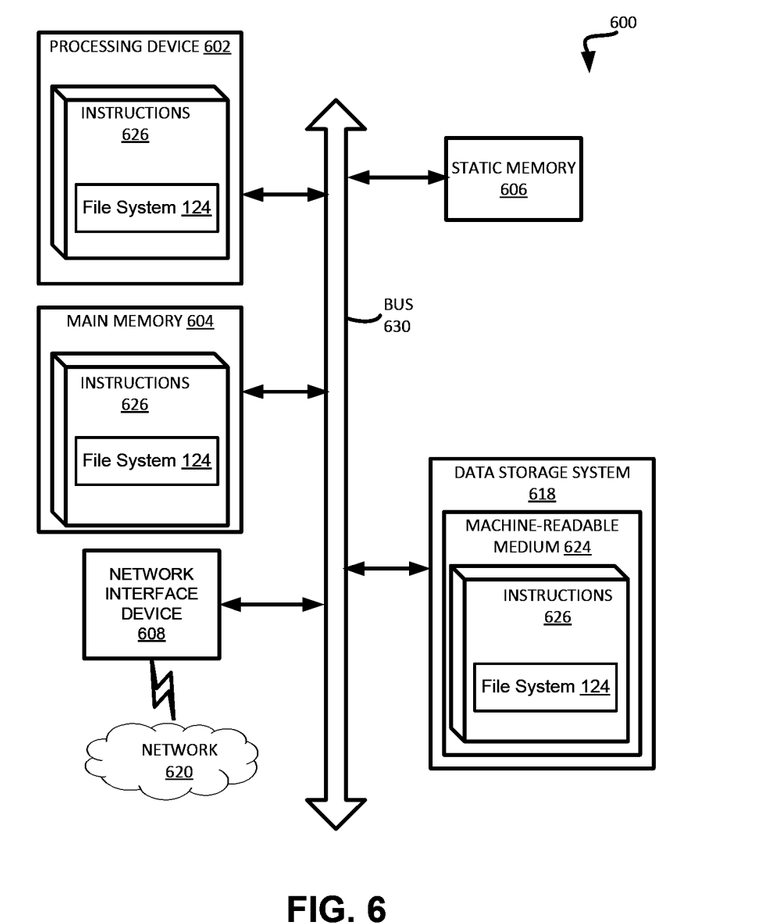
FIG. 6 is a block diagram of an example computer system in which embodiments of the present disclosure can operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIGS. 1A-1B) that includes, is coupled to, or utilizes a memory sub-system (e.g., the memory sub-system 110 of FIG. 1A). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a non-transitory computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1A.

In one embodiment, the instructions 626 include instructions to implement functionality corresponding to the file system 124 of FIGS. 1A-1B. While the machine-readable storage medium 624 is shown in an example embodiment to be a single medium, the term "non-transitory machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., non-transitory computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a plurality of integrated circuit (IC) dice having memory cells; and
a processing device coupled to the plurality of IC dice, the processing device to perform operations comprising:
assigning a first stream identifier (ID) to a first data type generated by execution of an application within an operating system;
associating first files generated by the application with the first stream ID, wherein the first files are associated with the first data type;
allocating a first group of memory cells of the plurality of IC dice to the first files, wherein the first group of memory cells is assigned the first stream ID;
causing, based on the first stream ID, the first files to be written sequentially to the first group of memory cells of the plurality of IC dice; and
wherein, in response to the first group of memory cells becoming fully written, the operations further comprising:
allocating a second group of memory cells of the plurality of IC dice to the first files, wherein the second group of memory cells is assigned a second stream ID;
associating the first files with the second stream ID; and
causing, based on the second stream ID, additional ones of the first files to be sequentially written to the second group of memory cells.

2. The system of claim 1, wherein the operations further comprise associating a block group, which is a contiguous portion of one of the first files, with the first group of memory cells using the first stream ID.

3. The system of claim 1, wherein the operations being performed are executed by a filing system of the operating system and further comprise:
assigning a third stream ID to the file system;
associating second files of file system metadata generated by the file system with the third stream ID;
allocating a third group of memory cells of the plurality of IC dice to the second files, wherein the third group of memory cells is assigned the third stream ID; and
causing, based on the third stream ID, the second files to be written sequentially to the third group of memory cells of the plurality of IC dice.

4. The system of claim 3, wherein the file system metadata comprises one of an inode or an extent map.

5. The system of claim 1, wherein the operations being performed are executed by a file system of the operating system and further comprise:
assigning a third stream ID to system metadata generated by execution of the operating system;
associating second files containing the system metadata with the third stream ID;
allocating a third group of memory cells of the plurality of IC dice to the second files, wherein the third group of memory cells is assigned the third stream ID; and
causing, based on the third stream ID, the second files to be written sequentially to the third group of memory cells of the plurality of IC dice.

6. The system of claim 1, wherein the application comprises a log structure merge (LSM)-based architecture that handles multiple data types including the first data type, the operations further comprising:
assigning a third stream ID to a second data type of the multiple data types;
associating second files with the third stream ID, wherein the second files correspond to the second data type;
allocating a third group of memory cells of the plurality of IC dice to the second files, wherein the third group of memory cells is assigned the third stream ID; and
causing, based on the third stream ID, the second files to be written sequentially to the third group of memory cells of the plurality of IC dice.

7. The system of claim 6, wherein the multiple data types comprise one or more of administrative data, a particular data directory for a particular type of data files, a commit log, or a system-based log.

8. A method comprising:
retrieving, by a processing device executing a file system of an operating system, a block group to be written to a plurality of integrated circuit (IC) dice, the block group being a contiguous portion of a file;
accessing, by the processing device, block group metadata associated with the block group to determine a stream identifier (ID) assigned to the block group with which the file is associated according to data type;
determining, by the processing device, whether there is space available in a group of memory cells, assigned to the stream ID, of the plurality of IC to which to allocate the block group;
in response to determining that there is allocable space available in the group of memory cells:
accessing, within the block group metadata of the block group, a write pointer associated with the group of memory cells; and
allocating, by the processing device, within the group of memory cells, a contiguous range of physical addresses beyond the write pointer to which to sequentially write the block group; and
in response to the group of memory cells becoming fully written:
allocating a second group of memory cells of the plurality of IC dice to the file, wherein the second group of memory cells is assigned a second stream ID;
associating the file with the second stream ID; and
causing, by the processing device and based on the second stream ID, additional contiguous portions of the file to be sequentially written to the second group of memory cells.

9. The method of claim 8, further comprising:
assigning the group of memory cells to the file associated with the data type via association of the stream ID with the block group and with the group of memory cells; and
generating an input-output (IO) write request that will cause the block group to be sequentially written to the contiguous range of physical addresses of the group of memory cells, starting at the write pointer.

10. The method of claim 8, further comprising, in response to determining that there is no allocable space available in the group of memory cells for the block group:
determining there is the second group of memory cells that is available for new allocations;
allocating the block group to the second group of memory cells; and
assigning the second stream ID associated with the second group of memory cells to the block group.

11. The method of claim 10, further comprising:
determining that there is allocable space available in the second group of memory cells;
accessing, within the block group metadata, a second write pointer associated with the second group of memory cells; and
allocating, within the second group of memory cells, a contiguous range of physical addresses beyond the second write pointer to which to sequentially write the block group.

12. The method of claim 8, further comprising:
retrieving a second block group to be written to the plurality of IC dice, the second block group associated with a second file;
accessing block group metadata associated with the second block group to determine that the second block group has not been allocated to a group of memory cells;
determining there is a third group of memory cells that is available for new allocations;
allocating the second block group to the third group of memory cells; and
assigning a third stream ID associated with the third group of memory cells to the second block group.

13. The method of claim 12, further comprising:
determining that there is allocable space available in the third group of memory cells;
accessing, within the block group metadata associated with the second block group, a second write pointer associated with the third group of memory cells; and
allocating, within the third group of memory cells, a contiguous range of physical addresses beyond the second write pointer to which to sequentially write the second block group.

14. A non-transitory computer-readable medium storing instructions, which when executed by a processing device, cause the processing device to perform operations comprising:
  assigning a first stream identifier (ID) to a data type generated due to execution of an operating system;
  associating first files of system data generated by the operating system with the first stream ID, wherein the first files are associated with the data type;
  allocating a first group of memory cells of a plurality of IC dice to the first files, wherein the first group of memory cells is assigned the first stream ID;
  causing, based on the first stream ID, the first files to be written sequentially to the first group of memory cells of the plurality of IC dice; and
  wherein, in response to the first group of memory cells becoming fully written:
    allocating a second group of memory cells of the plurality of IC dice to the first files, wherein the second group of memory cells is assigned a second stream ID;
    associating the first files with the second stream ID; and
    causing, based on the second stream ID, additional ones of the first files to be sequentially written to the second group of memory cells.

15. The non-transitory computer-readable medium of claim 14, wherein the operations further comprise associating a block group, which is a contiguous portion of one of the first files, with the first group of memory cells using the first stream ID.

16. The non-transitory computer-readable medium of claim 14, wherein the operations being performed are executed by a filing system of the operating system, and the system data is one of superblocks of data or system metadata generated by the operating system.

17. The non-transitory computer-readable medium of claim 16, wherein the first stream ID is assigned to the superblocks of data, and the operations further comprise:
  assigning a third stream ID to the system metadata;
  associating second files containing the system metadata with the third stream ID;
  allocating a third group of memory cells of the plurality of IC dice to the second files, wherein the third group of memory cells is assigned the second stream ID; and
  causing, based on the third stream ID, the second files to be written sequentially to the third group of memory cells of the plurality of IC dice.

18. The non-transitory computer-readable medium of claim 14, wherein the processing device also executes an application within the operating system, and the operations further comprise:
  assigning a third stream ID to a second data type generated by execution of the application;
  associating second files generated by the application with the third stream ID, wherein the second files are associated with the second data type;
  allocating a third group of memory cells of the plurality of IC dice to the second files, wherein the third group of memory cells is assigned the third stream ID; and
  causing, based on the third stream ID, the second files to be written sequentially to the third group of memory cells of the plurality of IC dice.

19. The non-transitory computer-readable medium of claim 14, wherein the operations being performed execute a file system within the operating system, and the operations further comprising:
  assigning a third stream ID to the file system;
  associating second files of file system metadata generated by the file system with the third stream ID;
  allocating a third group of memory cells of the plurality of IC dice to the second files, wherein the third group of memory cells is assigned the third stream ID; and
  causing, based on the third stream ID, the second files to be written sequentially to the third group of memory cells of the plurality of IC dice.

* * * * *